US009227471B2

(12) United States Patent
Kosugi et al.

(10) Patent No.: US 9,227,471 B2
(45) Date of Patent: Jan. 5, 2016

(54) TIRE POSITION DETERMINATION SYSTEM (71) Applicant: KABUSHIKI KAISHA TOKAI RIKA DENKI SEISAKUSHO, Aichi (JP)

(72) Inventors: Masanori Kosugi, Aichi (JP); Yuta Tsuchikawa, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 0 days.

(21) Appl. No.: 14/136,139

(22) Filed: Dec. 20, 2013

(65) Prior Publication Data

US 2014/0184402 A1 Jul. 3, 2014

(30) Foreign Application Priority Data

Dec. 27, 2012 (JP) ................................. 2012-286282

(51) Int. Cl.
 *B60C 23/00* (2006.01)
 *B60C 23/04* (2006.01)
(52) U.S. Cl.
 CPC ......... *B60C 23/0489* (2013.01); *B60C 23/0416* (2013.01)
(58) Field of Classification Search
 CPC ............ B60C 23/0408; B60C 23/0415; B60C 23/0416; B60C 23/0488; B60C 23/0489
 USPC ........................ 340/442, 447; 73/146.2, 146.5
 See application file for complete search history.

(56) References Cited

U.S. PATENT DOCUMENTS

| 7,253,726 | B2 | 8/2007 | Okubo |
| 2006/0055524 | A1 | 3/2006 | Okubo |
| 2013/0169428 | A1 | 7/2013 | Shima et al. |
| 2013/0327136 | A1 | 12/2013 | Kretschmann |

FOREIGN PATENT DOCUMENTS

| DE | 10238571 | 3/2004 |
| DE | 102011004561 | 8/2012 |
| JP | 2006-062516 | 3/2006 |
| JP | 2012-126341 | 7/2012 |
| WO | 2005/069993 | 8/2005 |
| WO | 2012/157306 | 11/2012 |

OTHER PUBLICATIONS

Search report from E.P.O., mail date is Mar. 7, 2014.
U.S. Appl. No. 14/136,574 to Masanori Kosugi et al., filed Dec. 20, 2013.
U.S. Appl. No. 14/030,550 to Masanori Kosugi, filed Sep. 18, 2013.
U.S. Appl. No. 14/107,617 to Masanori Kosugi et al., filed Dec. 16, 2013.

*Primary Examiner* — Thomas Mullen
(74) *Attorney, Agent, or Firm* — Greenblum & Bernstein P.L.C.

(57) ABSTRACT

A tire position determination system includes a tire pressure detector attached to each tire to generate a tire pressure signal. An acceleration detector generates gravitational information for each tire pressure detector. A receiver arranged in a vehicle body receives the tire pressure signal from each tire pressure detector. An axle rotation amount detector detects an axle rotation amount of an axle corresponding to each tire and generates pulses indicative of the detected axle rotation amount. An automatic locator determines the position of each tire based on the gravitational force and the pulses. A pulse combination determination unit determines whether or not a combination of the pulses from the axle rotation amount detectors is appropriate. A pulse acquisition timing setting unit sets an acquisition timing of the pulse signal for the automatic locator based on the determination of the pulse combination determination unit.

9 Claims, 8 Drawing Sheets

Fig.3A
1st Vehicle Stop

Fig.3B
2nd Vehicle Stop

Fig.4A $$\theta1 = \cos^{-1}\left(\frac{Gr1}{G}\right)$$

$(0° \leq \theta1 \leq 180°)$

Fig.4B $$\theta2 = \cos^{-1}\left(\frac{Gr2}{G}\right)$$

$(0° \leq \theta2 \leq 180°)$ $\theta1 + \theta2 \rightarrow$ Detector Rotation Angle $\theta b$

| | | | | | | | | | |
|---|---|---|---|---|---|---|---|---|---|
| 1st Data String Subject to Determination | 1 | 2 | 1 | 2 | 2 | | | | |
| 2nd Data String Subject to Determination | | 2 | 1 | 2 | 2 | 2 | | | |
| 3rd Data String Subject to Determination | | | 1 | 2 | 2 | 2 | 1 | | |
| 4th Data String Subject to Determination | | | | 2 | 2 | 2 | 1 | 2 | |
| 5th Data String Subject to Determination | | | | | 2 | 2 | 1 | 2 | 3 |
| 6th Data String Subject to Determination | | | | | | 2 | 1 | 2 | 3 | 4 |

Fig.14A
1st Determination Timing t1

Fig.14B
2nd Determination Timing t2

Fig.15A

PRIOR ART

Fig.15B

Slight Tire Rotation Caused by Vehicle Body Vibration

PRIOR ART

TIRE POSITION DETERMINATION SYSTEM

CROSS-REFERENCE TO RELATED APPLICATIONS

This application is based upon and claims the benefit of priority from prior Japanese Patent Application No. 2012-286282, filed on Dec. 27, 2012, the entire contents of which are incorporated herein by reference.

BACKGROUND OF THE INVENTION

The present invention relates to a tire position determination system for determining the position of a tire when monitoring the air pressure of the tire.

A direct tire pressure monitoring system is known in the art. In a direct tire pressure monitoring system, each tire includes a tire pressure detector that detects the tire pressure and transmits, through wireless communication, a tire pressure signal. The vehicle body includes a receiver that receives the tire pressure signal from each tire pressure detector. The tire pressure monitoring system monitors the pressure of each tire based on the tire pressure signal. This type of tire pressure monitoring system recognizes the position of each tire is located and determines where a tire having low pressure is located relative to the vehicle body. However, tires may change positions. Further, a tire may be exchanged with a new one. Thus, a direct tire pressure monitoring system may include an automatic locating function that periodically checks the tire positions. Japanese Laid-Open Patent Publication Nos. 2006-062516 and 2012-126341 describe examples of direct tire pressure monitoring systems that realize the automatic locating function by attaching an initiator (trigger device) to each wheel well. The initiators transmit radio waves that result in the tire pressure detectors selectively transmitting radio waves to allow for the determination of tire positions.

However, the automatic locating function is realized by arranging an initiator in each wheel well. Thus, the automatic locating function that uses the initiators increases the number of components and raises the component cost.

SUMMARY OF THE INVENTION

One aspect of the present invention is a tire position determination system for determining positions of tires. The tire position determination system includes a tire pressure detector attached to each tire. The tire pressure detector generates a tire pressure signal. An acceleration detector generates gravitational information for each tire pressure detector. A receiver is arranged in a vehicle body. The receiver receives the tire pressure signal from each tire pressure detector. An axle rotation amount detector detects an axle rotation amount of an axle corresponding to each tire. The axle rotation amount detector generates pulses indicative of the detected axle rotation amount. An automatic locator determines the position of each tire based on the gravitational force from the acceleration detector and the pulses from the axle rotation amount detector. The automatic locator includes a pulse combination determination unit that determines whether or not a combination of the pulses from the axle rotation amount detectors is appropriate. A pulse acquisition timing setting unit sets an acquisition timing of the pulses for the automatic locator based on the determination of the pulse combination determination unit.

Other aspects and advantages of the present invention will become apparent from the following description, taken in conjunction with the accompanying drawings, illustrating by way of example the principles of the invention.

DETAILED DESCRIPTION OF THE PREFERRED EMBODIMENTS

The applicant of the present application has invented a method for determining the position of a tire from the rotation amount information of an axle and the gravitational information of a tire pressure detector without using an initiator. In this method, the rotation amount information of the axle and the gravitational information of the tire pressure detector are acquired twice. When the vehicle is parked or stopped, the rotation amount information of the axle and the gravitational information of the tire pressure detector are acquired for the first time. When the vehicle is parked or stopped again, the rotation amount information of the axle and the gravitational information of the tire pressure detector are acquired for the second time. The rotation angle acquired from the difference between the first and second rotation amount information of the axle is compared with the rotation angle acquired from the difference between the first and second gravitational information of the tire pressure detector to determine the tire position.

Figure 15A:
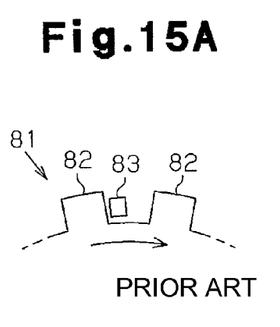
FIGS. 15A and 15B are schematic diagrams illustrating when erroneous pulses are output from the axle rotation amount sensor in the prior art.
Figure 15B:
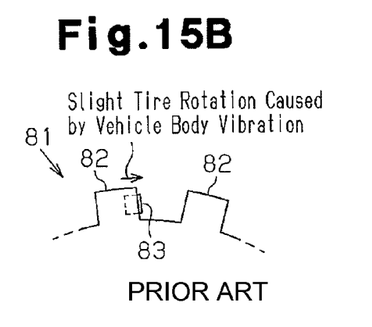

Referring to FIG. 15, an axle rotation amount detection sensor 81 includes a sensing unit 83 arranged on a vehicle body. The sensing unit 83 sequentially detects teeth 82 projecting from an axle that rotates together with a corresponding tire. As shown in FIG. 15A, the sensing unit 83 may be located proximal to a tooth 82 when the vehicle stops. In this case, as shown in FIG. 15B, when the vehicle body moves and slightly rotates the tire, the sensing unit 83 may detect the tooth 82. That is, if the vehicle body moves when the vehicle is parked or stopped, an unnecessary detection of the tooth 82 occurs. This may lower the determination accuracy of the tire position.

A tire position determination system according to a first embodiment of the present invention will now be described with reference to FIGS. 1 to 8.

Figure 1:
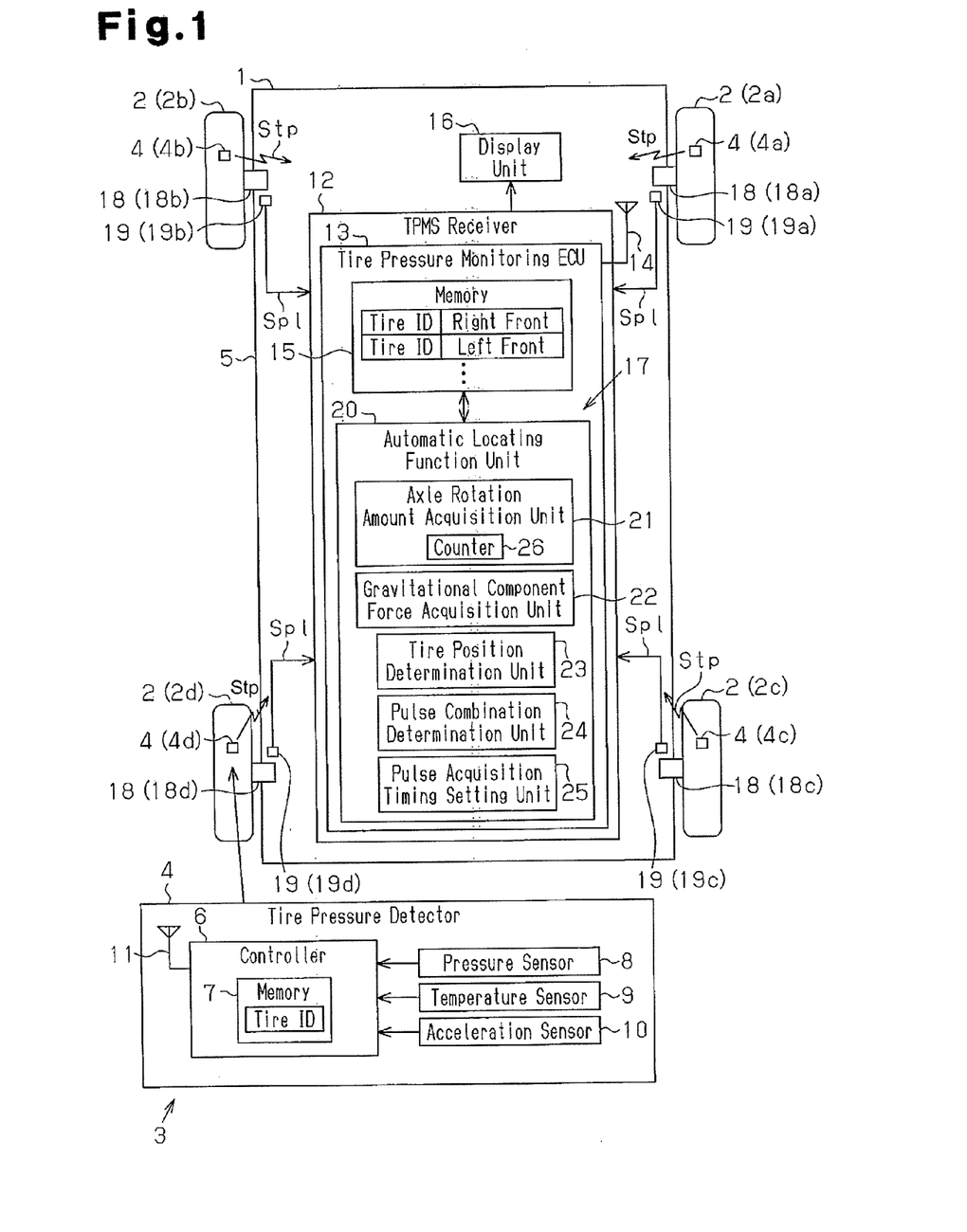
FIG. 1 is a schematic diagram showing a first embodiment of a tire position determination system.

As shown in FIG. 1, a vehicle 1 includes a tire pressure monitoring system (TPMS) 3 that monitoring the tire pressure of tires 2 (2a to 2d). In the tire pressure monitoring system 3 of the present example, the tires 2a to 2d includes tire pressure detectors 4 (4a to 4d, also referred to as tire valves). The tire pressure monitoring system 3 is of a direct type that transmits, through wireless communication, a tire pressure signal Stp from each of the tire pressure detector 4a to 4d to a vehicle body 5 to monitor the tire pressure of each tire 2a to 2d at the vehicle body 5.

The tire pressure detectors 4a to 4d each include a controller 6 that controls the operation of the corresponding tire pressure detectors 4a to 4d. The controller 6 includes a memory 7 that stores a tire ID (also referred to as valve ID) as a unique ID of the corresponding one of the tires 2a to 2d. Each of the tire pressure detectors 4a to 4d includes a pressure sensor 8 that detects the pressure of the corresponding tire 2, a temperature sensor 9 that detects the temperature of the corresponding tire 2, and an acceleration sensor 10 that detects the acceleration (rotation) of the corresponding tire 2 and generates a detection signal. In each of the tire pressure detectors 4a to 4d, the pressure sensor 8, the temperature sensor 9, and the acceleration sensor 10 are connected to the controller 6. The controller 6 is connected to a transmission antenna 11 capable of transmitting radio wave on the ultrahigh frequency (UHF) band. The acceleration sensor 10 serves as a gravitational component force detection unit.

The vehicle body 5 includes a receiver (hereinafter referred to as the TPMS receiver) 12 that receives the tire pressure signal Stp transmitted from each of the tire pressure detectors 4a to 4d and monitors the pressure of the tire 2. The TPMS receiver 12 includes a tire pressure monitoring electronic control unit (ECU) 13, which controls the operation of the TPMS receiver 12, and a reception antenna 14, which is capable of receiving UHF radio waves. The tire pressure monitoring ECU 13 includes a memory 15 that stores the tire ID of each of the tires 2a to 2d in correspondence with its position (right front, left front, right rear, and left rear). The TPMS receiver 12 is, for example, connected to a display unit 16 arranged in an instrument panel.

Each tire pressure detector 4 determines whether the corresponding tire 2 is rotating based on the detection signal from the acceleration sensor 10. When determining that the corresponding tire 2 is rotating, each tire pressure detector 4 transmits tire pressure signals Stp to the vehicle body 5 in regular or controlled variable cycles. Each tire pressure detector 4 determines whether the corresponding tire 2 is rotating based on changes in the acceleration (gravitation) detected by the tire pressure detector 4. When determining that the corresponding tire 2 is not rotating, each tire pressure detector 4 transmits tire pressure signals Stp to the vehicle body 5 in intervals that are the same as or greater than the intervals when the corresponding tire is rotating.

When the tire pressure signal Stp from each of the tire pressure detectors 4a to 4d is received by the reception antenna 14, the TPMS receiver 12 verifies the tire ID of the tire pressure signal Stp. When the tire ID is verified, the TPMS receiver 12 checks the pressure data in the tire pressure signal Stp including the tire ID. When the pressure is smaller than or equal to a low pressure threshold value, the TPMS receiver 12 shows on the display unit 16 that a tire has low pressure and where that tire is located. The TPMS receiver 12 determines the tire pressure from the tire pressure signal Stp whenever the tire pressure signal Stp is received to monitor the pressure of each of the tires 2a to 2d.

As shown in FIG. 1, the tire pressure monitoring system 3 includes a tire position determination system 17 that determines where each tire 2a to 2d is mounted on the vehicle body 5. The tires 2a to 2d are respectively coupled to axles 18 (18a to 18d). Axle rotation amount detection sensors 19 (19a to 19d) are respectively attached to the axles 18 (18a to 18d). In the present example, the tire pressure monitoring ECU 13 acquires the axle rotation amount information from the axle rotation amount detection sensors 19 (19a to 19d) of the axles 18a to 18d and the gravitational information from the acceleration sensors 10 of the tire pressure detectors 4a to 4d. The tire pressure monitoring ECU 13 includes an automatic locator 20 that determines the mounting positions of the tires 2a to 2d based on the axle rotation amount information and the gravitational information. The automatic locator 20 automatically locates the tires 2a to 2d in predetermined intervals. The axle rotation amount detection sensors 19 (19a to 19d) each serve as an axle rotation amount detector.

Each axle rotation amount detection sensor 19a to 19d includes an antilock brake system (ABS) sensor. For example, when the tire is rotating, each of the axle rotation amount detection sensor 19a to 19d sequentially detects a plurality of (e.g., forty-eight) teeth arranged on the corresponding one of the axles 18a to 18d with a sensor on the vehicle body 5 and provides rectangular pulse signals Sp1 to the TPMS receiver 12. For example, each of the axle rotation amount detection sensors 19a to 19d detects both rising and falling faces or edges each pulse and generates ninety-six pulses for each rotation of the corresponding tire 2.

Figure 2:
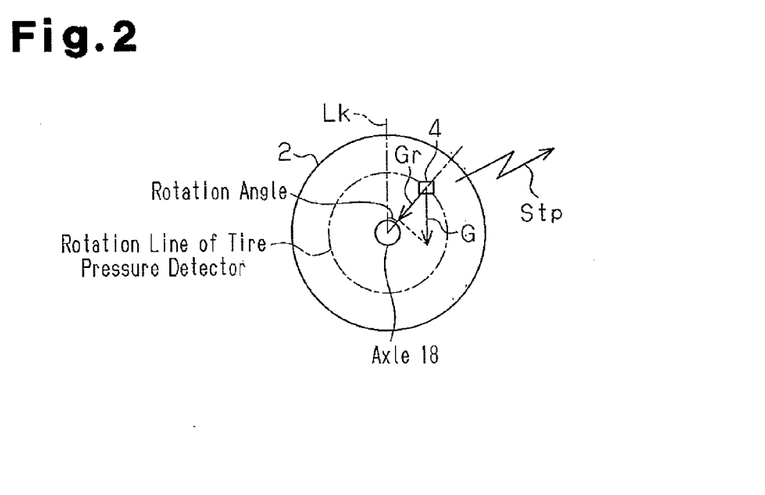
FIG. 2 is a diagram illustrating the concept of a gravitational component force detected by a tire pressure detector.

As shown in FIG. 2, the acceleration sensor 10 detects a gravitational component force Gr in a direction toward the corresponding axle 18 (tire radial direction) relative to gravity G as the gravitational force applied to the tire pressure detector 4. The rotation angle of the tire pressure detector 4 relative to a vertical line Lk extending through the center of the tire 2 (axle 18) is based on the gravitational component force Gr. The rotation angle is obtained from $\cos^{-1}(Gr/G)$. As the tire pressure signal Stp, the acceleration sensor 10 of the present example transmits a signal including pressure data, temperature data, gravitational component force data, a tire ID, and the like. The gravitational component force Gr is one example of gravitational information.

As shown in FIG. 1, the automatic locator 20 includes an axle rotation amount acquisition unit 21, a gravitational component force acquisition unit 22, and a tire position determination unit 23. The axle rotation amount acquisition unit 21 acquires the number of pulses detected by the pulse signal Sp1 from each of the axle rotation amount detection sensors 19a to 19d, that is, the axle rotation amount N of each of the axles 18a to 18d. The gravitational component force acquisition unit 22 acquires the gravitational component force Gr from the tire pressure signal Stp of each of the tire pressure detectors 4a to 4d.

The tire position determination unit 23 determines the mounting position of each tire 2a to 2d based on the axle rotation amount N from the axle rotation amount acquisition unit 21, and the gravitational component force Gr from the gravitational component force acquisition unit 22. The tire position determination unit 23 computes a rotation angle (axle rotation angle) θa for each of the tires 2a to 2d in accordance with the axle rotation amount N based on the axle rotation amount N1 when the vehicle is parked or stopped for the first time and the axle rotation amount N2 when the vehicle is parked or stopped for the second time. Further, the tire position determination unit 23 computes a rotation angle (detector rotation angle) θb for each of the tires 2a to 2d in accordance with the gravitational component force Gr based on the gravitational component force Gr1 when the vehicle is parked or stopped for the first time and a gravitational component force Gr2 when the vehicle is parked or stopped for the second time. The tire position determination unit 23 compares the axle rotation angle θa and the detector rotation angle θb and specifies the mounting position of each tire 2a to 2d.

Figure 3A:
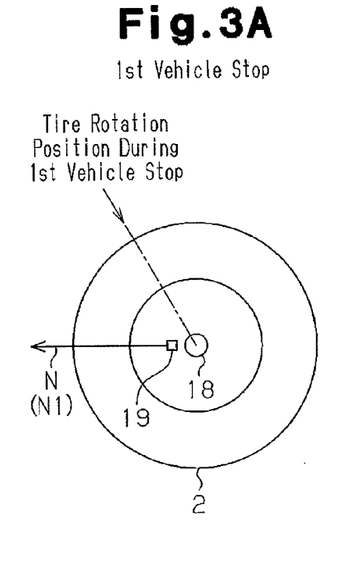
FIGS. 3A and 3B are diagrams illustrating the axle rotation angle.
Figure 3B:
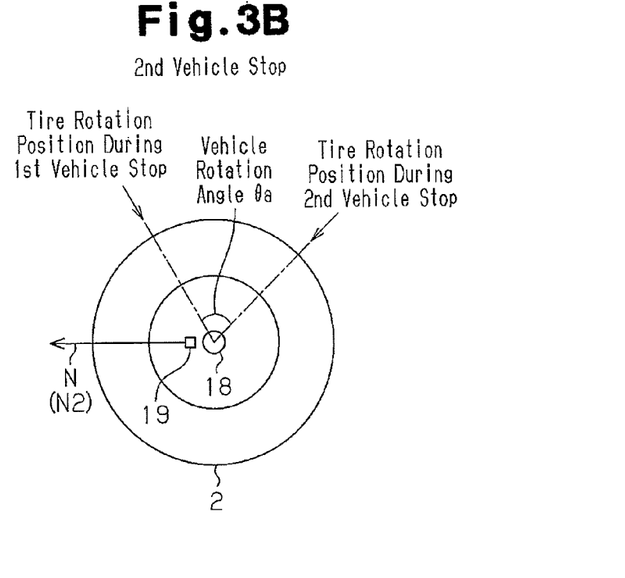

FIG. 3 shows one example of the axle rotation angle θa. The axle rotation angle θa corresponds to the rotation angle of the axle 18 in the second vehicle stopping operation with the rotational position of the axle 18 using the first vehicle stopping operation as a reference. For example, when the vehicle 1 travels along a curved road, the tires 2a to 2d rotate differently from one another. Each axle 18a to 18d has a different rotation amount. Thus, the number of pulses output from the axle rotation amount detection sensors 19a to 19d differ from each other depending on the positions of the axle rotation amount detection sensors 19a to 19d on the corresponding tires. Thus, by checking the axle rotation angle θa obtained for each of the axles 18a to 18d, the amount of rotation of the four axles 18a to 18d at the front left and right sides and the rear left and right sides may be obtained from the first stopping of the vehicle to the second stopping of the vehicle.

Figure 4A:
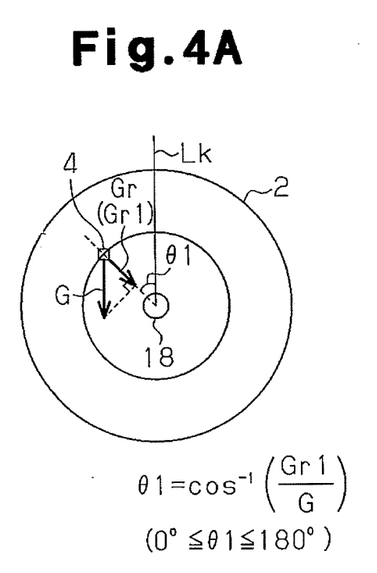
FIGS. 4A and 4B are diagrams illustrating the detector rotation angle.
Figure 4B:
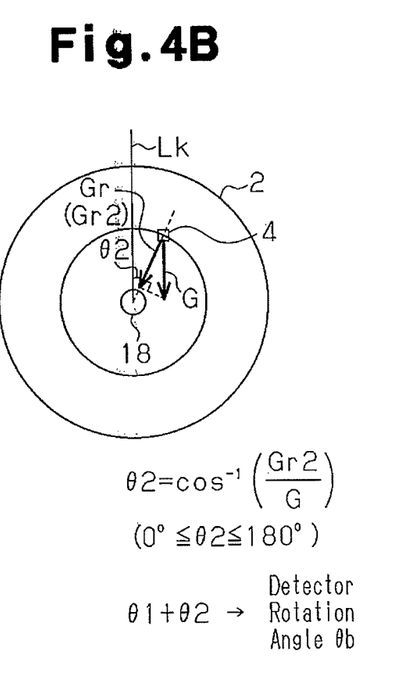

FIG. 4 shows one example of the detector rotation angle θb. For example, the tire position determination unit 23 substitutes the gravitational component force Gr1 of the first vehicle stopping operation with $\cos^{-1}$ (Gr/G) to compute angle (detector angle) θ1 of the tire pressure detector 4 with respect to the vertical line Lk in the first vehicle stopping operation. In the same manner, the tire position determination unit 23 substitutes the gravitational component force Gr2 of the second vehicle stopping operation with $\cos^{-1}$ (Gr/G) to compute angle (detector angle) θ2 of the tire pressure detector 4 with respect to the vertical line Lk in the second vehicle stopping operation. The tire position determination unit 23 computes the sum of the detector angle θ1 and the detector angle θ2 to acquire the detector rotation angle θb. The first vehicle stopping operation is one example of a preceding vehicle stopping operation, and the second vehicle stopping operation is one example of a following vehicle stopping operation.

The automatic locator 20 includes a pulse combination determination unit 24 that determines whether or not the combination of the pulses formed by the pulse signals Sp1 received from the axle rotation amount detection sensors 19a to 19d is appropriate. The axle rotation amount detection sensors 19a to 19d sequentially detect the teeth on the corresponding axles 18a to 18d and provide pulses (pulse signals Sp1) to the receiver 12. The axle rotation amount detection sensors 19a to 19d independently generate pulse signals Sp1. Thus, the TPMS receiver 12 sequentially receives the pulses, and the pulse combination determination unit 24 generates a data string having a finite length and corresponding to the output order of the pulses. The pulse combination determination unit 24 checks whether or not the pulses of every one of the axle rotation amount detection sensors 19a to 19d are included in the data string to determine whether or not the pulse combination is appropriate.

The automatic locator 20 includes a pulse acquisition timing setting unit 25 that sets the timing for acquiring the pulse signal Sp1 based on the determination of the pulse combination determination unit 24. When the pulse combination determination unit 24 determines that the pulse combination is inappropriate, the pulse acquisition timing setting unit 25 ignores the inappropriate pulse combination. On the other hand, when the pulse combination determination unit 24 determines that the pulse combination is appropriate, the pulse acquisition timing setting unit 25 sets the appropriate pulse combination as a pulse measurement initiation point.

The operation of the tire position determination system 17 will now be described with reference to FIGS. 5 to 8.

Figure 5:
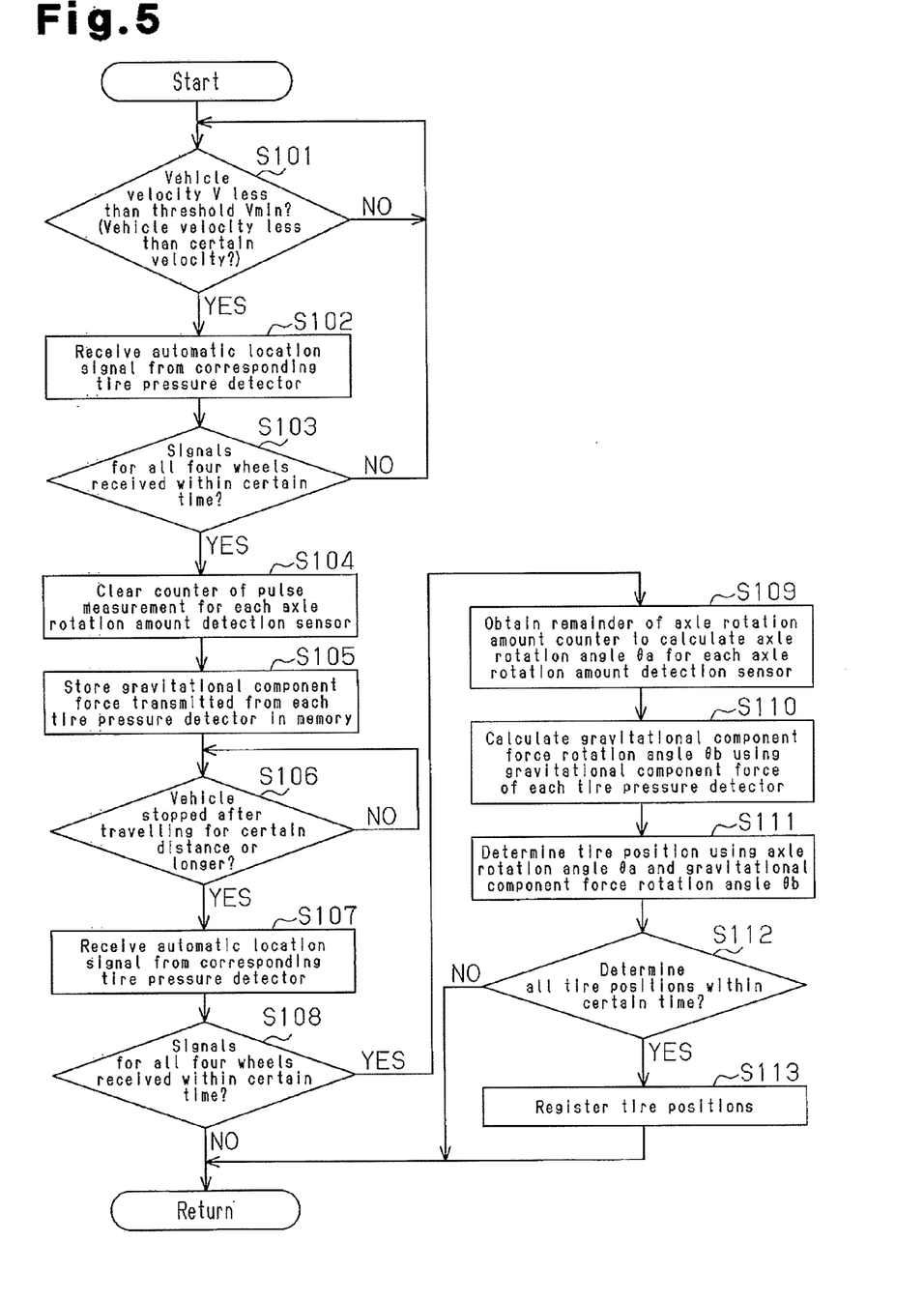
FIG. 5 is a flowchart illustrating automatic location procedures.

Referring to FIG. 5, in step S101, the tire pressure monitoring ECU 13 determines whether or not the vehicle velocity V is lower than the threshold value Vmin based on the vehicle velocity data acquired from a meter ECU (not shown) or the like. In other words, it is determined whether or not the vehicle 1 shifts to a first vehicle stopping operation. When shifting to the first vehicle stopping operation, the automatic locator 20 proceeds to step S102. When not shifting to the first vehicle stopping operation, the automatic locator 20 waits in step S101.

In step S102, the tire pressure monitoring ECU 13 receives the tire pressure signal Stp transmitted from each of the tire pressure detectors 4a to 4d of the vehicle with the reception antenna 14 in the first vehicle stopping operation. In other words, in the first vehicle stopping operation, the gravitational component force acquisition unit 22 reads the gravitational component force data of the tire pressure signal Stp transmitted from each of the tire pressure detectors 4a to 4d and collects the gravitational component forces Gr1 of the tire pressure detectors 4a to 4d.

In step S103, the gravitational component force acquisition unit 22 determines whether or not the gravitational component force Gr1 in the first vehicle stopping operation has been acquired from all of the tire pressure detectors 4a to 4d within a certain time. When the gravitational component force acquisition unit 22 determines that the gravitational component force Gr1 in the first vehicle stopping operation has been acquired from all of the tire pressure detectors 4a to 4d within a certain time, the automatic locator 20 proceeds to step S104. The tire pressure detectors 4a to 4d may be located at null points due to the tire rotation position when the vehicle stops. Thus, if radio waves cannot be received from the four wheels even after continuously receiving radio waves for a certain time, the automatic locator 20 returns to step S101 to acquire the radio waves at a different vehicle stopping timing.

In step S104, the axle rotation amount acquisition unit 21 resets a counter 26 for the axle rotation amount detection sensors 19a to 19d of the axles 18a to 18d. In other words, the axle rotation amount acquisition unit 21 starts to count the pulses provided from each axle rotation amount detection sensor 19a to 19d when the vehicle 1 starts to travel after the first vehicle stopping operation.

Here, the pulse combination determination unit 24 determines whether or not the combination of the pulses transmitted from the axle rotation amount detection sensors 19a to 19d is appropriate. When determined that the pulse combination is appropriate, the pulse acquisition timing setting unit 25 provides the axle rotation amount acquisition unit 21 with a pulse measurement initiation point notification. When the axle rotation amount acquisition unit 21 receives the pulse measurement initiation point notification from the pulse acquisition timing setting unit 25, the axle rotation amount acquisition unit 21 initiates pulse measurement.

Figure 6:
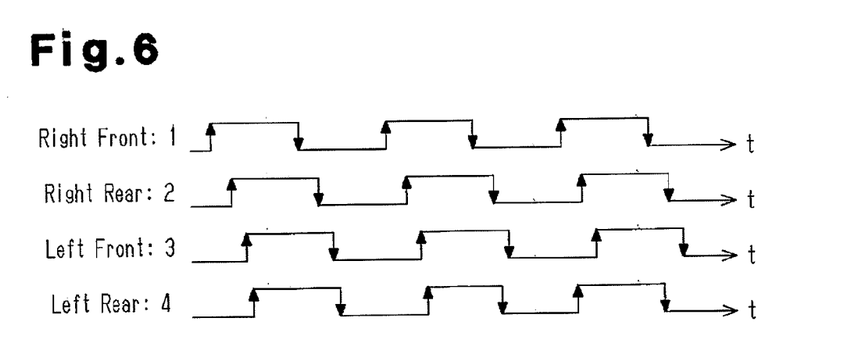
FIG. 6 is a waveform chart of pulses output from axle rotation detection sensors under a normal situation.

FIG. 6 illustrates pulses in the order received by the TPMS receiver in a normal situation. The pulses transmitted from the right front axle rotation amount detection sensor 19a have rising and trailing edges, each of which is referred to as edge "1." The pulses transmitted from the right rear axle rotation amount detection sensor 19c have rising and trailing edges, each of which is referred to as edge "2." The pulses transmitted from the left front axle rotation amount detection sensor 19b have rising and trailing edges, each of which is referred to as edge "3." The pulses transmitted from the left rear axle rotation amount detection sensor 19d have rising and trailing edges, each of which is referred to as edge "4." A pulse is counted whenever a rising edge or trailing edge of a pulse is detected.

When the vehicle 1 is traveling straight in a normal situation, the tires on the four wheels rotate at the same time, and the rotation amount of tires on the four wheels are substantially the same. Thus, the TPMS receiver 12 receives pulses (pulse edges) from the axle rotation amount detection sensors 19a to 19d of all four wheels in the order of "1," "2," "3," and "4." Then, the TPMS receiver 12 receives edge "1" again. In this manner, the TPMS receiver 12 repetitively receives the pulses.

The width between adjacent teeth is fixed in each ABS sensor. Further, each pulse signal has a duty cycle of 50%. When the vehicle turns, there is a difference in the turn radius between the inner and outer wheels depending on the direction of the turn (e.g., for a right-hand turn, the right side wheels will be the inner wheels while the left side wheels will be outer wheels and vice versa). Accordingly, the left side and right side wheels must traverse a different distance, and this difference is referenced as the track distance hereinafter. When there is a track (i.e. distance) difference between the inner and outer wheels, (mounted on the axles, the tires mounted on the wheels), such as when the vehicle turns, the interval between pulses slightly changes. In this case, the pulse edges are not received in the order of "1," "2," "3," and "4" and the order in which the pulse edges are received may be changed. In the example of FIG. 6, the pulse width of the signal from the left rear axle rotation amount detection sensor 19d becomes short. Thus, the order of the received pulse edges changes from "1," "2," "3," and "4" to "1," "4," "2," and "3."

When the four pulses are considered to be a single group, edges "1" to "4" all appear in each group after the pulse measurement starts. Thus, the measured number of pulses is determined as being appropriate. Accordingly, in the example of FIG. 6, the axle rotation amount N is correctly measured.

Figure 7:
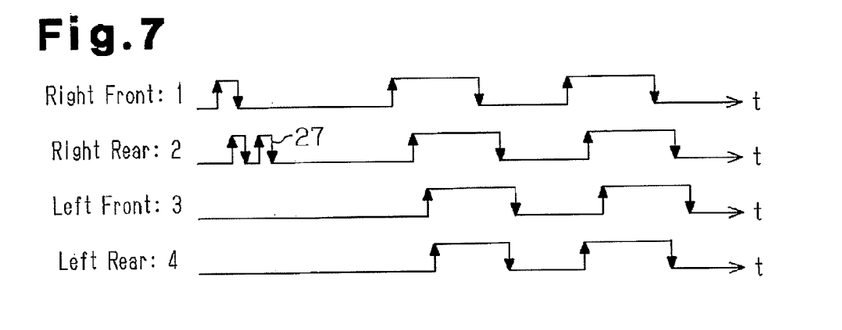
FIG. 7 is a waveform chart of pulses output from the axle rotation detection sensors when the vehicle body vibrates.

However, referring to FIG. 7, for example, when the parked vehicle 1 is pushed and the vehicle body is vibrated, the pulses may become irregular. In this case, as described in the prior art section, if the sensing unit of the ABS sensor is located in the proximity of a tooth when the vehicle is parked, vibration of the vehicle body may result in the sensing unit detecting the tooth as the corresponding tire 2 slightly rotates. FIG. 7 shows an example in which the right side of the vehicle body is pushed when the vehicle is stopped. In this case, the right front axle rotation amount detection sensor 19a and the right rear axle rotation amount detection sensor 19c react to the vehicle movement. In the example of FIG. 7, the pulse edges are detected in the order of "1," "2," "1," "2," "2," "2," "1," "2," "3," and "4."

Figure 8:
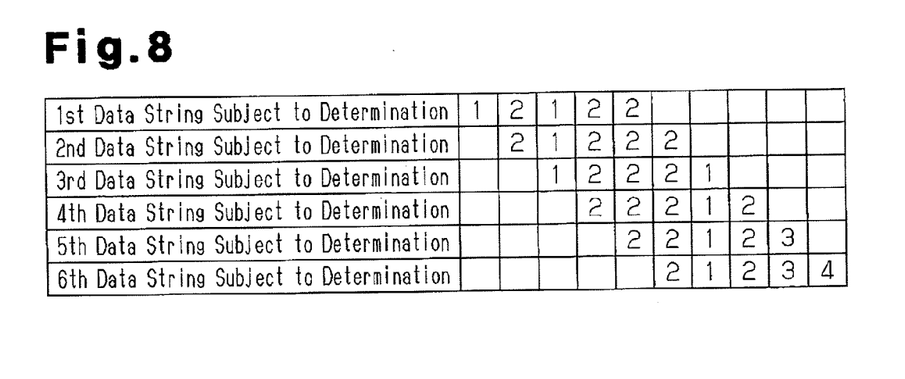
FIG. 8 is a table illustrating specific examples subject to pulse determinations.

FIG. 8 shows specific examples of pulse determinations. The pulse combination determination unit 24 determines whether or not the pulses are appropriate by checking whether pulses from all of the axle rotation amount detection sensors 19a to 19d are included in the data string of pulses in order of transmission from the axle rotation amount detection sensors 19a to 19d. For example, a single data string includes five pulses. The pulse combination determination unit 24 checks whether edges "1" to "4" are all included in the data string subject to the determination. When the data string does not include any one of edges "1" to "4," the pulse combination determination unit 24 waits for the next pulse output. When a new pulse is generated, the pulse combination determination unit 24 deletes the head pulse of the preceding data string, carries over the remaining pulses of the preceding data string, and determines whether or not the pulse combination of the carried data string is appropriate. This determination is repeated whenever a new pulse is generated.

In the example of FIG. 8, the first data string subject to determination includes only pulse edges "1" and "2." Thus, the pulse combination determination unit 24 determines that the first data string subject to determination is inappropriate. The second to fourth data strings subject to determination also include only pulse edges "1" and "2." The fifth data string subject to determination includes only pulse edges "1" to "3." Thus, the pulse combination determination unit 24 determines that the first to fifth data strings subject to determination are invalid.

The sixth data string subject to determination includes all of pulse edges "1" to "4." Thus, the pulse combination determination unit 24 determines that the sixth data string subject to determination is appropriate. The pulse acquisition timing setting unit 25 provides the axle rotation amount acquisition unit with a pulse measurement initiation point notification indicating that the head of the sixth data string subject to determination corresponds to a timing for initiating pulse measurement. The axle rotation amount acquisition unit 21 starts pulse measurement from the initiation point of the timing determined by the pulse acquisition timing setting unit 25 in accordance with the pulse measurement initiation point notification. In the example of FIG. 7, pulse measurement is started from the initiation point set at pulse edge 27.

Referring to FIG. 5, in step S105, the gravitational component force acquisition unit 22 temporarily stores the gravitational component force Gr1 of each of the tire pressure detectors 4a to 4d acquired in step S102 in the memory 15 as gravitational component force Gr1 of each of the tire pressure detectors 4a to 4d in the first vehicle stopping operation.

In step S106, after the vehicle 1 has travelled for a certain distance, the tire pressure monitoring ECU 13 determines whether or not the vehicle velocity V is lower than the threshold value Vmin based on the vehicle velocity data acquired from a meter ECU or the like. In other words, the tire pressure monitoring ECU 13 determines whether or not the vehicle 1 has shifted to a second vehicle stopping operation. If the vehicle 1 has shifted to the second vehicle stopping operation, the automatic locator 20 proceeds to step S107. If the vehicle 1 has not shifted to the second vehicle stopping operation, the automatic locator 20 waits in step S106.

In step S107, the tire pressure monitoring ECU 13 receives the tire pressure signal Stp transmitted from each of the tire pressure detectors 4a to 4d of the vehicle with the reception antenna 14 in the second vehicle stopping operation. In other words, in the second vehicle stopping operation, the gravitational component force acquisition unit 22 collects the gravitational component forces Gr2 of the tire pressure detectors 4a to 4d from the tire pressure signals Stp of the tire pressure detectors 4a to 4d.

In step S108, the gravitational component force acquisition unit 22 determines whether or not the gravitational component force Gr2 in the second vehicle stopping operation has been acquired from all of the tire pressure detectors 4a to 4d within a certain time. When the gravitational component force acquisition unit 22 determines that the gravitational component force Gr2 in the second vehicle stopping operation has been acquired from all of the tire pressure detectors 4a to 4d within a certain time, the automatic locator 20 proceeds to step S109. When the gravitational component force acquisition unit 22 determines that the gravitational component force Gr2 in the second vehicle stopping operation has not been acquired from all of the tire pressure detectors 4a to 4d within a certain time, the automatic locator 20 forcibly terminates the process. In step S108, the processing waits for radio waves to be received for a certain time for the same reason as step S103. Thus, if all the gravitational component forces Gr2 cannot be acquired within a certain time, the automatic locator 20 forcibly terminates the process and executes the process at a different opportunity.

In step S109, the tire position determination unit 23 obtains the remainder of the counter value by dividing the pulses measured by the counter 26 (number of measured pulses) of each of the axle rotation amount detection sensors 19a to 19d by a total number of pulses input for each rotation of the tire. The tire position determination unit 23 computes the axle rotation angle θa based on the remainder of the counter value for each of the axle rotation amount detection sensors 19a to 19d.

In step S110, the tire position determination unit 23 computes the detector rotation angle θb of each of the tire pressure detectors 4a to 4d based on the gravitational component forces Gr1 and Gr2 acquired from the tire pressure detectors 4a to 4d in each of the first vehicle stopping operation and the second vehicle stopping operation.

In step S111 shown in FIG. 6, the tire position determination unit 23 specifies the mounting position of each of the tires 2a to 2d using the axle rotation angle θa obtained in step S109 and the detector rotation angle θb obtained in step S110. For example, the tire position determination unit 23 checks which one of the axle rotation angles θa corresponds to the detector rotation angle θb and determines the mounting position of each of the tires 2a to 2d, that is, the relationship between the tire ID and the tire position. In this case, the mounting positions of all four wheels are determined as long as the axle rotation angles θa each have a corresponding detector rotation angle θb.

In step S112, the tire position determination unit 23 determines whether or not the positions of all the tires 2a to 2d have been determined within a certain time. If the mounting positions of all the tires 2a to 2d have been determined within a certain time, the automatic locator 20 proceeds to step S113. If the mounting positions of all of the tires 2a to 2d have not determined within the certain time, the automatic locator 20 forcibly terminates the process.

In step S113, the tire position determination unit 23 registers the determined tire position in the memory 15 of the tire pressure monitoring ECU 13. In other words, the tire position determination unit 23 stores the tire IDs for the front right and left and rear right and left tires 2a to 2d in the memory 15. This completes automatic location of the tires 2a to 2d. The automatic location may be repeatedly executed in predetermined cycles, for example.

The present embodiment has the advantages described below.

(1) The pulse combination determination unit 24 determines whether or not pulses from all of the axle rotation amount detection sensors 19a to 19d are included in the data string of pulses (five pulses subject to determination) in order of transmission from the axle rotation amount detection sensors 19a to 19d. For example, a single data string includes five pulses. If a data string does not include any one of the pulses from the axle rotation amount detection sensors 19a to 19d, when a new pulse is generated, the pulse combination determination unit 24 deletes the head pulse of the preceding data string, carries over the remaining pulses of the preceding data string, and checks whether or not the pulse combination of the carried data string is appropriate. This determination is repeated. When the pulse combination determination unit 24 determines that a data string includes pulses from all of the axle rotation amount detection sensors 19a to 19d, the previous output pulses are all ignored, and pulse measurement is started. Thus, for example, when the vehicle body 5 vibrates and an unexpected pulse is transmitted from the axle rotation amount detection sensors 19a to 19d, the unexpected pulse may be ignored. This allows for tire positions to be determined by only acquiring pulses that should be acquired. Thus, tire positions are accurately determined.

(2) The axle rotation angle θa is the remainder obtained after dividing the pulses counted between the first vehicle stopping operation and the second vehicle stopping operation by the total pulses per tire rotation. In this manner, the axle rotation angle θa may easily be obtained through a simple calculation.

(3) Each of the axle rotation amount detection sensors 19a to 19d generates a pulse whenever detecting a particular portion. Thus, the axle rotation amount detection sensors 19a to 19d allow for accurate determination of the tire positions.

Second Embodiment

A second embodiment will now be described with reference to FIGS. 9 and 10. The second embodiment differs from the first embodiment in how to determine whether or not the pulses are appropriate. To avoid redundancy, like or same reference numerals are given to those components that are the same as the corresponding components of the first embodiment. The description will focus on the differing portions.

Figure 9:
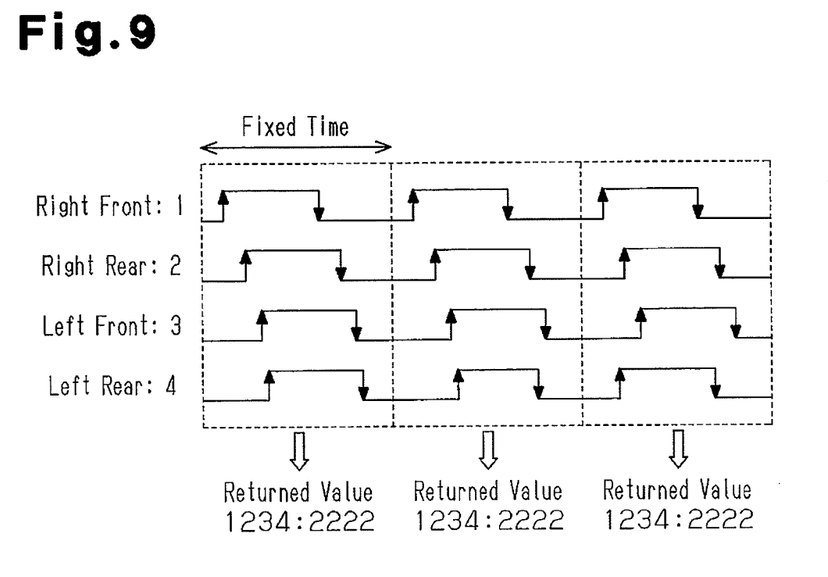
FIG. 9 is a waveform chart of pulses output from axle rotation detection sensors under a normal situation in a second embodiment.

As shown in FIG. 9, each of the axle rotation amount detection sensors 19a to 19d accumulates sensor outputs (pulse edges) in fixed periods, and then generates a returned value of the accumulated number of pulse edges. In the example of FIG. 9, the returned value for every fixed period is expressed as "1234: ****." Here, in "1234," "1" represents the pulse edges of the axle rotation amount detection sensor 19a, "2" represents the pulse edges of the axle rotation amount detection sensor 19c, "3" represents the pulse edges of the axle rotation amount detection sensor 19b, and "4" represents the pulse edges of the axle rotation amount detection sensor 19d. The asterisks following the colon each represent the accumulated value of the corresponding wheel. In this example, "1234: 2222" is repetitively output.

When the axle rotation amount detection sensors 19 generate the returned values, the pulse combination determination unit 24 checks whether the difference in the pulse edges "1," "2," "3," and "4" is greater than or equal to a threshold. For example, the pulse combination determination unit 24 obtains differences between the total of pulse edges "1," the total of pulse edges "2," the total of pulse edges "3," and the total of pulse edges "4." The pulse combination determination unit 24 determines whether or not the differences are greater than or equal to the threshold. When the differences are all less than the threshold, the pulse combination determination unit 24 determines that the returned value is appropriate. When any one of the differences is greater than or equal to the threshold, the pulse combination determination unit 24 determines that the returned value is inappropriate.

Figure 10:
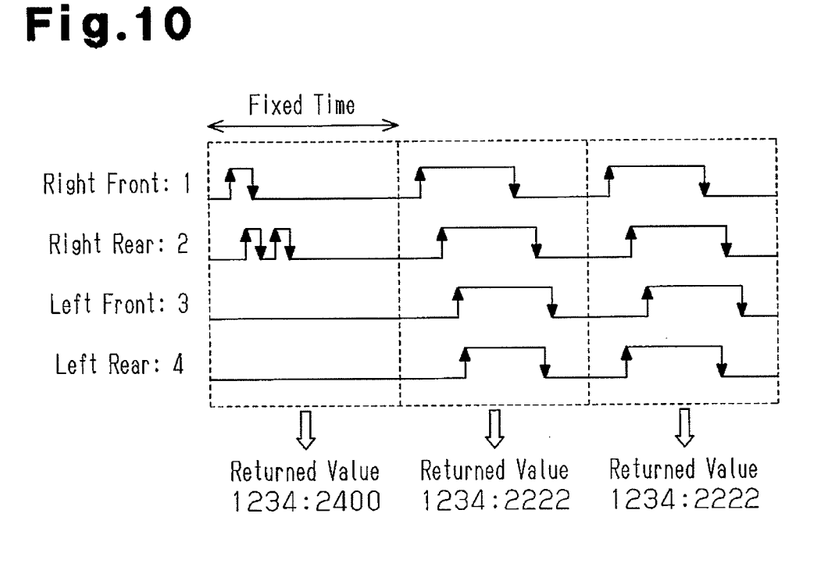
FIG. 10 is a waveform chart of pulses output from the axle rotation detection sensors when the vehicle body vibrates.

FIG. 10 illustrates an example in which irregular pulses are generated due to vibration of the vehicle 1. In the example of FIG. 10, the axle rotation amount detection sensor 19 generates the returned values in the order of "1234: 2400," "1234: 2222," and "1234: 2222." The first returned value "1234:

2400" indicates that there is a difference between the accumulated values of the four wheels.

The pulse combination determination unit 24 of the present example acquires the difference in the accumulated values of the four wheels. When the difference is less than a threshold (e.g., "2"), the pulse combination determination unit 24 determines that the pulse combination is appropriate. When the difference is greater than or equal to the threshold, the pulse combination determination unit 24 determines that the pulse combination is inappropriate. As illustrated in FIG. 10, in the first returned value, the accumulated value of pulse edges "1" is 2, and the accumulated value of pulse edges "2" is 4. The difference in the accumulated value of pulse edges "1" and the accumulated value of pulse edges "2" is obtained as "4−2=2." Accordingly, the difference is greater than or equal to the threshold. Thus, the pulse combination determination unit 24 determines that the first returned value is inappropriate and ignores the pulse combination. That is, the pulse combination determination unit 24 does not acquire the pulse combination.

In the second returned value, the accumulated values of pulse edges "1" to "4" is 0 and thus less than the threshold. Thus, the pulse combination determination unit 24 determines that the second returned value is appropriate. The pulse acquisition timing setting unit 25 provides the axle rotation amount acquisition unit 21 with a pulse measurement initiation point notification and acquires the second returned value. Thus, the axle rotation amount acquisition unit 21 acquires the second returned value and starts pulse measurement.

In addition to advantages (1) and (2) of the first embodiment, the second embodiment has the following advantage.

(4) The axle rotation amount detection sensors 19a to 19d generate returned values, which indicate the number of times the detected portion is detected within a certain time. Thus, the use of the axle rotation amount detection sensors 19a to 19d allows for accurate determination of the tire positions.

Other Calculation Examples of Detector Rotation Angle

Other calculation examples of the detector rotation angle will now be described with reference to FIGS. 11 to 14.

Figure 11:
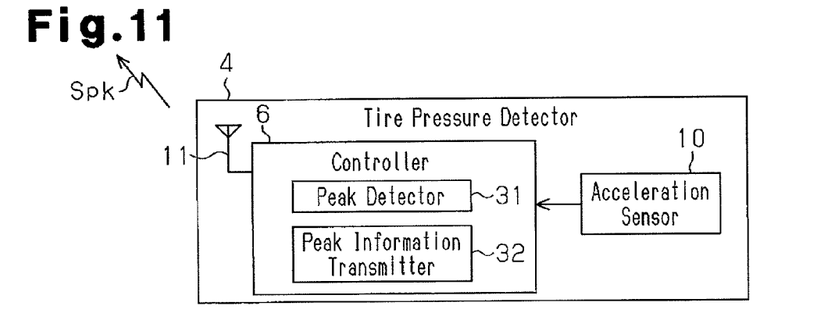
FIG. 11 is a block diagram of a tire pressure detector in a further example.

Referring to FIG. 11, the controller 6 of each tire pressure detector 4 includes a peak detector 31 and a peak information transmitter 32. The peak detector 31 detects whether the gravitational component force is located at a peak, that is, whether the tire pressure detector 4 is located at a pole in the tire rotation direction. The peak information transmitter 32 provides the TPMS receiver 12 with peak information Spk indicating that the gravitational component force Gr has reached a peak value. The peak detector 31 detects, for example, whether the gravitational component force Gr has a minimum value, that is, whether the tire pressure detector 4 is located at a peak of the tire rotation line (i.e., twelve o'clock position). The peak information Spk is one type of a signal that includes the tire ID or a command for notification of the peak value of the gravitational component force Gr. For example, when determining that the vehicle velocity has decreased based on the amount of change in the gravitational component force Gr, the peak information transmitter 32 transmits, through wireless communication, the peak information Spk. The peak detector 31 and the peak information transmitter 32 configure one example of a characteristic information notification unit, and the peak information Spk is one example of characteristic information.

Figure 12:
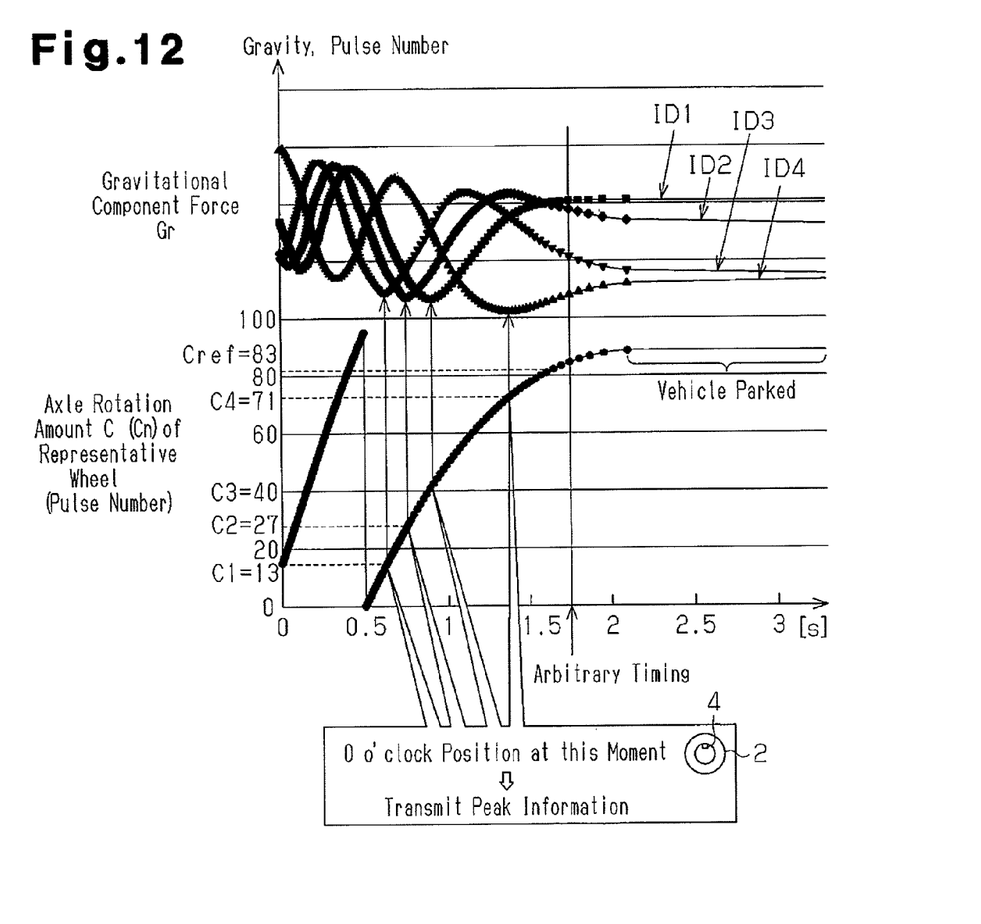
FIG. 12 is a waveform diagram showing changes in the axle rotation amount of a representative wheel and the gravitational component force of each sensor.

As shown in FIG. 12, the tire position determination unit 23 stores the axle rotation amount Cn (n=1 to 4) of a representative wheel (on which one of the tires 4 is mounted) whenever receiving the peak information Spk from each of the tire pressure detectors 4a to 4d. After the axle rotation amount Cn is obtained for all of the wheels (on which the tires, 4 are mounted), the tire position determination unit 23 obtains the detector angle θk of each of the tire pressure detectors 4a to 4d. The representative wheel is preferably a rear wheel where the track (i.e. distance) difference between the inner and outer wheels as the vehicle turns is small. The detector angle θk is the angular position of each of the tire pressure detectors 4a to 4d in the tire rotation direction from the twelve o'clock position when viewing the vehicle body 5 from one side.

The present example reads the axle rotation amount Cn (n=1 to 4) of the representative wheel when the gravitational component force Gr has the peak value (twelve o'clock position). For example, when the right rear tire pressure detector 4c (ID3) is located at the twelve o'clock position, the axle rotation amount C1 of the representative wheel is "13." When the left front tire pressure detector 4b (ID2) is located at the twelve o'clock position, the axle rotation amount C2 of the representative wheel is "27." When the right front tire pressure detector 4a (ID1) is located at the twelve o'clock position, the axle rotation amount C2 of the representative wheel is "40." When the left rear tire pressure detector 4d (ID4) is located at the twelve o'clock position, the axle rotation amount C2 of the representative wheel is "71."

After obtaining the axle rotation amounts C1 to C4 of the representative wheel 33 for all of the tire pressure detectors 4a to 4d at the twelve o'clock position, at a certain timing, for example, when the axle rotation amount Cref of the representative wheel becomes "83," the detector angle θk of each of the tire pressure detectors 4a to 4d is calculated. The certain timing may be when a predetermined time elapses from when the axle rotation amounts C1 to C4 of all four wheels are obtained. Alternatively, the certain timing may be the moment the axle rotation amount of the final one of the axle rotation amounts Cn is acquired.

Figure 13:
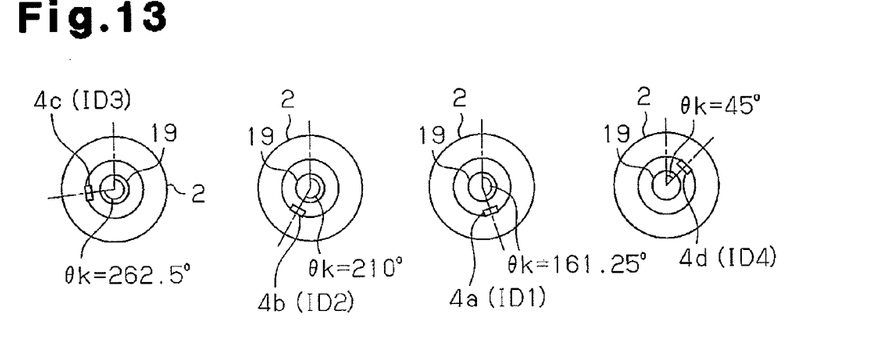
FIG. 13 is a diagram showing examples of the detector angle of each tire pressure sensor.

As shown in FIG. 13, the detector angle θk of each of the tire pressure detectors 4a to 4d is an angle advanced from the twelve o'clock position by a predetermined number of pulses. When the certain determination timing corresponds to when the pulses of the representative wheel is "83," tire pressure detector 4c (ID3) would be 262.5°, which is calculated from (83−13)×360/96 using the twelve o'clock position as a reference (0 degrees). Tire pressure detector 4b (ID2) would be 210°, which is calculated from (83−27)×360/96 using the twelve o'clock position as a reference (0 degrees). Tire pressure detector 4a (ID1) would be 161.25°, which is calculated from (83−40)×360/96 using the twelve o'clock position as a reference (0 degrees). Tire pressure detector 4d (ID4) would be 45°, which is calculated from (83−71)×360/96 using the twelve o'clock position as a reference (0 degrees).

Figure 14A:
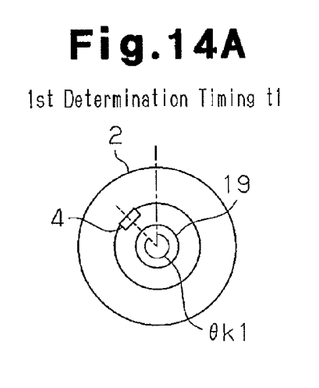
FIGS. 14A and 14B are diagrams illustrating the detector rotation angle.
Figure 14B:
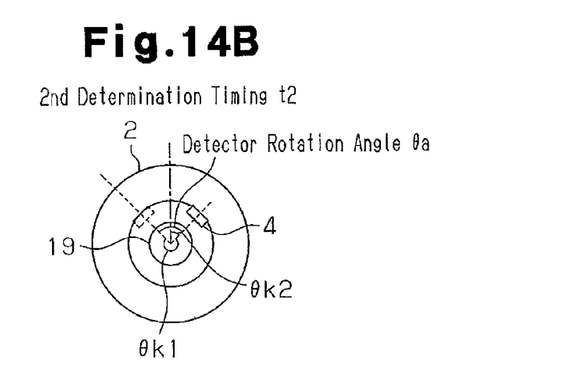

Referring to FIG. 14, the difference of the detector angle θk1 of each of the tire pressure detectors 4a to 4d obtained at the first determination timing t1 and the detector angle θk1 of each of the tire pressure detectors 4a to 4d obtained at the second determination timing t2, which is subsequent to the first determination timing t1, is obtained. The detector rotation angle θb of each of the tire pressure detectors 4a to 4d between the first determination timing t1 and the second determination timing t2 may be calculated. In such a configuration, the tire position determination unit 23 calculates the detector rotation angle θb of each of the tire pressure detectors 4a to 4d. The first determination timing t1 is one example of a preceding determination time, and the second determination timing t2 is one example of a subsequent determination time.

The tire position determination unit 23 calculates the detector angle θk at the first determination timing t1 and the second determination timing t2. Based on the detector angle θk1, which is calculated at the first determination timing t1, and the detector angle θk2, which is calculated at the second determination timing t2, the tire position determination unit 23 calculates the detector rotation angle θb of each of the tire pressure detectors 4a to 4d between the first determination timing t1 and the second determination timing t2. The tire position determination unit 23 compares the detector rotation angle θb and the axle rotation angle θa to determine the tire positions.

In this calculation, even when the gravitational component force Gr detected by the acceleration sensor 10 includes an error, temperature tolerance, or the like caused by centrifugal force produced when the tire rotates, the detector rotation angle θb may be accurately detected. Further, the automatic location is executed at a low speed. This suppresses interference between the peak information transmitted from the tire pressure detectors 4a to 4d. Thus, automatic location may be completed within a short period of time. Further, the vehicle does not have to stop to perform the automatic location, and the tire positions may be determined at the desired timing when the vehicle speed is low.

It should be apparent to those skilled in the art that the present invention may be embodied in many other specific forms without departing from the spirit or scope of the invention. Particularly, it should be understood that the present invention may be embodied in the following forms.

In the first embodiment, the data string subject to determination is not limited to five pulses, and the number of pulses may be changed to, for example, to six seven or eight pulses. The number of pulses reversed in order (i.e. in a different sequence) is determined by the track distance difference between inner and outer wheels as the vehicle turns. Thus, the number of pulses in a data string may be set in accordance with the track distance difference between the inner and outer wheels as the vehicle turns.

In the first embodiment, the number of data strings may be increased (e.g., ten) to check whether or not a number of pulses from each of the axle rotation amount detection sensors 19a to 19d are included in each data string and determine whether the pulse combination is appropriate. In this case, the pulse combination has to include a number of pulses of each of the axle rotation amount detection sensors 19a to 19d to be determined as being appropriate. This further improves the tire position determination accuracy.

In the above embodiments, the radio wave transmitted from each tire pressure detector 4 during automatic location is not limited to the tire pressure detector signal Stp and may be, for example, a radio wave dedicated for automatic location (automatic location signal).

In the above embodiments, when the vehicle stops, tire pressure signal Stp may be transmitted with the number of frames temporarily increased.

In the above embodiments, when determined that the vehicle has stopped, the tire pressure detector 4 may readily transmit the tire pressure signal Stp.

In each of the above embodiments, the acceleration sensor 10 does not have to be a sensor that detects the gravitational component force Gr in a direction perpendicular to the direction toward the axle or a dual-axes sensor that detects gravitational component forces in both of the direction toward the axle and the direction perpendicular to the direction toward the axle.

In the above embodiments, the detector rotation angle θb is not limited to a value calculated from the sum of θ1 and θ2. For example, the detector rotation angle θb that may be taken in the range of 0° to 360° may all be extracted and checked to find the conforming axle rotation angle θa to determine the tire positions.

In the above embodiments, the gravitational component force detection unit is not limited to the acceleration sensor 10 as long as it is a sensor that detects the gravitational force produced at the tire pressure detector 4.

In the above embodiments, the axle rotation amount detector is not limited to an ABS sensor and may be replaced by any sensor that may detect the rotation amount of the axle 18.

In the above embodiments, the radio waves transmitted from the tire pressure detector 4 may have frame contents that differ between modes or is are the same in each mode.

In the above embodiments, the collection of the gravitational component force Gr is not limited to when the vehicle stops and may be performed when, for example, the vehicle is parked.

In the above embodiments, the automatic location may also be performed on a spare tire.

In the above embodiments, the execution of the automatic location is not limited to when the vehicle is stopped or parked and may be executed when the vehicle is travelling at a low speed such that it may be determined that the vehicle is about to stop.

In the above embodiments, the automatic location does not have to be executed when the vehicle stops and may be executed when, for example, the vehicle 1 is about to start travelling. In this case, reverse rotation of the tire 2 that may occur when the vehicle 1 is stopping does not have to be considered. This ensures the tire positioning accuracy.

In each of the above embodiments, the automatic location (e.g., calculation of the detector angle θk) may be changed to various modes as long as it uses a gravitational component force.

In the above embodiments, unexpected pulses resulting from vibrations when the vehicle stops or the like may be ignored. Thus, the automatic location determination of the above embodiments may be applied to any type of automatic location that uses the axle rotation amount.

The present examples and embodiments are to be considered as illustrative and not restrictive, and the invention is not to be limited to the details given herein, but may be modified within the scope and equivalence of the appended claims.

The invention claimed is:

1. A tire position determination system for determining positions of each of a plurality of tires, of a vehicle, each tire mounted on an associated axle of the vehicle, the tire position determination system comprising:
   a tire pressure detector attached to each tire, wherein the tire pressure detector generates a tire pressure signal;
   an acceleration detector, that generates gravitational force information, associated with each tire pressure detector;
   a receiver arranged in the vehicle, wherein the receiver receives the tire pressure signal from each tire pressure detector;
   a plurality of axle rotation amount detectors including an axle rotation amount detector for each axle that detects an axle rotation amount of the associated axle, wherein each of the plurality of axle rotation amount detectors generate pulses indicative of the detected axle rotation amount; and
   an automatic locator that determines the position of each tire based on the gravitational force information generated by and received from the associated acceleration detector and the pulses generated by and received from the associated axle rotation amount detector, wherein the automatic locator includes
- a pulse combination determiner that determines whether or not a combination of the pulses generated by and received from each axle rotation amount detector is an expected combination, and
- a pulse acquisition timing setter that sets an acquisition timing of the pulses for the automatic locator based on the determination of the pulse combination determiner.

2. The tire position determination system according to claim 1, wherein the pulse acquisition timing setter sets the acquisition timing of the pulses for the automatic locator when the pulse combination determiner determines that the combination of pulses from each axle rotation amount detector is the expected combination.

3. The tire position determination system according to claim 1, wherein the automatic locator measures the number of pulses from each axle rotation amount detector between a first vehicle stopping operation and a second vehicle stopping operation, divides the measured number of pulses by a total number of pulses produced for each rotation of the associated tire to obtain a remainder, and calculates an axle rotation angle corresponding to each tire based on the remainder.

4. The tire position determination system according to claim 1, wherein
- each axle rotation amount detector is configured to generate a pulse whenever detecting a predetermined portion of the associated axle,
- the pulse combination determiner determines whether or not a data string having a finite length and corresponding to the output order of the pulses includes pulses from all of the plurality of axle rotation amount detectors, and
- when a new pulse is generated, the pulse combination determiner deletes a head pulse of the data string, carries over the remaining pulses of the data string, to form a new data string, and determines whether or not the pulse combination of the new data string is the expected combination.

5. The tire position determination system according to claim 1, wherein
- each axle rotation amount detector is configured to generate a returned value indicative of the number of times each associated axle rotation amount detector generates a pulse within a certain period, and
- based on the returned value, the pulse combination determiner compares a difference in the number of generated pulses of each axle rotation amount detector with a threshold, and determines whether or not the pulses are the expected combination.

6. The tire position determination system according to claim 1, wherein
- the pulse combination determiner performs a sequence of determinations,
- the automatic locator calculates an axle rotation angle from the axle rotation amount detected by each axle rotation amount detector in a preceding determination by the pulse combination determiner and an axle rotation angle from the rotation axle amount detected by each axle rotation amount detector in a subsequent determination by the pulse combination determiner,
- the automatic locator calculates a detector rotation angle from a detector angle obtained from the gravitational force information generated by the acceleration detector in the preceding determination by the pulse combination determiner and a detector angle obtained from the gravitational force information of the acceleration detector in the subsequent determination by the pulse combination determiner, and
- the automatic locator determines the position of each tire based on the calculated axle rotation angle and the calculated detector rotation angle.

7. The tire position determination system according to claim 6, wherein
- the automatic locator calculates an axle rotation angle from an axle rotation amount obtained during a first vehicle stopping operation and an axle rotation amount obtained during a second vehicle stopping operation,
- the automatic locator calculates a detector rotation angle from a gravitational component force generated at each tire pressure detector during the first vehicle stopping operation and a gravitational component force generated at each tire pressure detector during the second vehicle stopping operation, and
- the automatic locator determines the position of each tire based on the calculated axle rotation angle and the calculated detector rotation angle.

8. The tire position determination system according to claim 1, wherein
- the acceleration detector detects a gravitational characteristic related to each tire pressure detector and generates characteristic information,
- each tire pressure detector includes a characteristic information notifier that transmits, through wireless communication, the characteristic information generated by the acceleration detector to the receiver,
- the automatic locator calculates, at a certain timing, a detector angle of each tire pressure detector based upon an axle rotation amount of a representative wheel when the receiver receives the characteristic information and the axle rotation amount of the representative wheel,
- the automatic locator calculates an axle rotation angle from an axle rotation amount acquired at a first determination timing and an axle rotation amount acquired at a second determination timing subsequent to the first determination timing,
- the automatic locator calculates a detector rotation angle from a detector angle obtained at the first determination timing and a detector angle obtained at the second determination timing, and
- the automatic locator determines the position of each tire based on the calculated axle rotation angle and the calculated detector rotation angle.

9. The tire position determination system according to claim 1, wherein
- the automatic locator acquires a first detector angle of each tire pressure detector from a hypothetical reference line extending in a vertical direction through the center of the corresponding tire based on a component of the gravitational force information in a first vehicle stopping operation,
- the automatic locator acquires a second detector angle of each tire pressure detector in a second vehicle stopping operation, and
- the automatic locator calculates a detector rotation angle from the first detector angle and the second detector angle.

* * * * *